Jan. 22, 1929.  
J. A. SHEA  
RIM LUG FOR AUTOMOBILE WHEELS  
Filed Feb. 27, 1925  
1,699,679

INVENTOR.  
John A. Shea  
BY  
U. G. Charles  
ATTORNEY.

Patented Jan. 22, 1929.

1,699,679

UNITED STATES PATENT OFFICE.

JOHN A. SHEA, OF CLIFTON, KANSAS.

RIM LUG FOR AUTOMOBILE WHEELS.

Application filed February 27, 1925. Serial No. 12,018.

My invention relates to rim lugs for automobile wheels.

The object of my invention is to provide a lug that is easily detached.

A further object of my invention is to provide a lug that when disengaged will remain intact with the rim of the wheel.

A still further object of my invention is to provide a lug the detaching means of which are such that much time is saved in changing the rim.

These and other objects will hereinafter be more fully disclosed.

In the various drawings like figures will refer to like parts.

Figure 1:
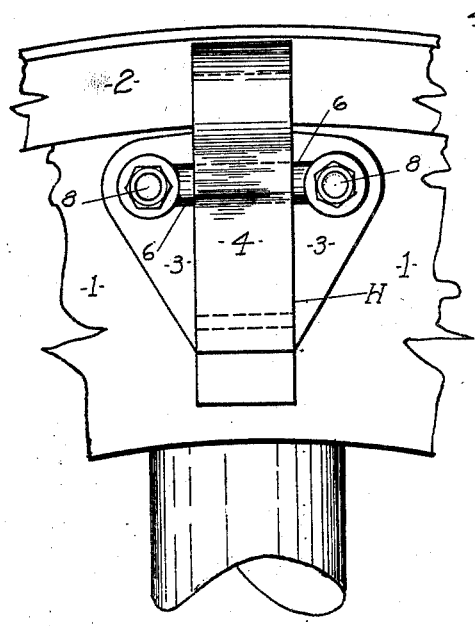
Figure 2:
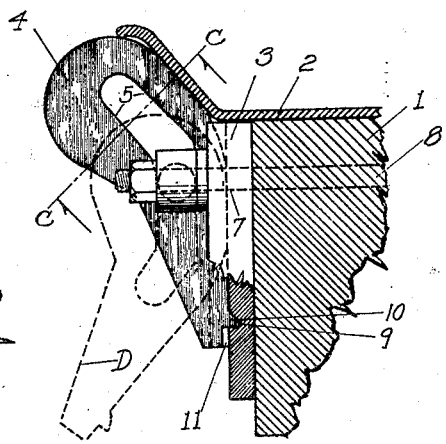
Figure 3:
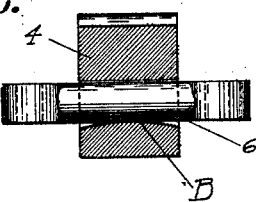
Figure 4:
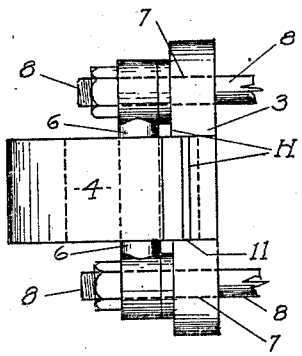

Fig. 1 is an elevation of a fragmentary part of a wheel showing the application of one of the lugs. Fig. 2 is a transverse view, the rim and felloe being in section, and the lug disengaged as shown by dotted lines. Fig. 3 is a sectional view of the lug taken on line C, in Fig. 2 looking in the direction of arrows. Fig. 4 is a transverse view of Fig. 2.

1 is the felloe of a wheel, 2 is a demountable rim for said wheel, 3 is a plate adapted to seat firmly on the side of said felloe, 4 is the lug adapted to engage in the channel H of said plate, the said lug having a curved slot 5, centrally disposed therein, and adapted to engage with a link 6, said link having apertures in each end thereof registering with apertures 7 in said plate, the said apertures passing through a boss as spacing means between said link and said plate, the said link and plate being firmly attached to the felloe by means of bolts 8.

The lug 4 has two planes on one side thereof acutely arranged, one plane adapted to engage with the rim of a wheel and the other in the channel H of the plate 3. The lug has a slot extending therethrough and formed to parallel the planes of the lug, and adapted to slidably engage on the link 6. The outer wall of the slot is curved as shown at B in Fig. 3, by which means the link is free to rock when either end thereof is released.

Transversely positioned to the lug and in close proximity to the inner end is a stop 10 adapted to engage in a groove 9 extending across the inner end of the channel, all of which is clearly shown in Figs. 1 and 2. Note that one side of the stop is at right angles to the adjacent face of the lug, and the opposite side slantingly positioned. The groove 9 coincides therewith in shape, by which means the lug is firmly attached and cannot be removed until a screw driver or like instrument is inserted in the space 11 between the outer end of the lug and the channel to pry the end of the lug outward, disengaging the stop from the groove, at which time a slight stroke on the opposite end of the lug will release its engagement from the rim, as shown by dotted lines D in Fig. 2. To engage the lug, a stroke on the inner end will cause retraction to its normal engagement, as shown in Figs. 1 and 2.

The wall of the slot 5 adjacent to the plate is crowned as shown at B, allowing the link to rock thereon when one end of said link is released, at which time the lug may be disengaged without prying the stop from the groove as heretofore described, but it is intended that sufficient tension may be imposed by tightening the bolts 8, that the lug will be held to engagement with the rim by reason of the engagement of the stop and groove.

It will be understood that the mechanism may be so accurately tensioned that the link together with the slight yielding of the rim will make it possible to drive the lug in or out of engagement without changing the tension.

It will be further understood that a plurality of lugs will engage on the felloe of the wheel and are equally spaced thereon, the slanting position of the outer ends of the lugs coinciding with the bevel of the rim. When all of the lugs are simultaneously engaged, the periphery of the rim is equally spaced from the felloe of the wheel. This arrangement of the lug obviates the use of a wedge, such as used on ordinary lugs, which firmly binds between the rim and felloe, making it difficult to remove the lug.

It will now be readily seen how quickly a rim may be removed or replaced. Such modification may be employed as lies within the scopes of the appended claims, and having thus described my invention what I claim as new and desire to secure by Letters Patent is:—

1. In a rim means for automobiles, a plate, a lug slidably mounted in said plate, said plate firmly attached to the felloe of the wheel, and the said lug by cantilever engagement adapted to bind firmly on the rim of the wheel.

2. In a rim retaining means for automobile wheels, in combination with the felloe of the wheel, a plate having a channel therein and a link crossing said channel, said link, plate, and felloe of the wheel being bound together simultaneously by bolts, a lug having a curved groove longitudinally disposed therein, said groove adapted to engage on said link for reciprocating movement, the outwardly extending end of said lug adapted to engage as binding means for the rim.

3. In a rim retaining means for automobile wheels, a channeled plate, a link engaging across the channel of said plate, the plate and link rigidly attached to the felloe of the wheel, a groove transversely positioned in the channel of said plate, a lug having an elongated slot positioned therein to slideably engage on the link, and a stop on one end of the lug to engage in said groove to prevent the lug from sliding when the opposite end thereof is in contact with the rim of the wheel.

4. In a rim retaining means for automobile wheels, the combination of a lug, a link, and a plate, a channel positioned in the plate, in which the lug will engage, a slot positioned in the lug and extending therethrough to receive the link and slidably engage thereon longitudinally of the lug, the link being adjustably connected to the plate, and a groove transversely positioned in the channel adjacent the end thereof, a stop integrally connected near the end of the lug to engage in the groove as locking means for the lug when normally positioned to engage with the rim of the wheel.

JOHN A. SHEA.